(12) United States Patent
Parsons et al.

(10) Patent No.: US 11,280,398 B2
(45) Date of Patent: Mar. 22, 2022

(54) LUBRICATION MANAGEMENT SYSTEMS FOR TILTROTOR AIRCRAFT

(71) Applicant: Textron Innovations Inc., Providence, RI (US)

(72) Inventors: Thomas Dewey Parsons, Fort Worth, TX (US); Troy Cyril Schank, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 933 days.

(21) Appl. No.: 16/025,147

(22) Filed: Jul. 2, 2018

(65) Prior Publication Data

US 2020/0003295 A1  Jan. 2, 2020

(51) Int. Cl.

| | |
|---|---|
| *F16H 57/04* | (2010.01) |
| *B64C 29/00* | (2006.01) |
| *B64C 11/28* | (2006.01) |
| *B60K 11/02* | (2006.01) |

(52) U.S. Cl.
CPC .......... *F16H 57/0445* (2013.01); *B60K 11/02* (2013.01); *B64C 11/28* (2013.01); *B64C 29/0033* (2013.01); *F16H 57/045* (2013.01); *F16H 57/0413* (2013.01); *F16H 57/0423* (2013.01); *F16H 57/0435* (2013.01); *F16H 57/0436* (2013.01); *F16H 57/0475* (2013.01)

(58) Field of Classification Search
CPC ............. F16H 57/0445; F16H 57/0413; F16H 57/0423; F16H 57/0435; F16H 57/0436; F16H 57/045; F16H 57/0475; B60K 11/02; B64C 11/28; B64C 29/0033
See application file for complete search history.

(56) References Cited

U.S. PATENT DOCUMENTS

| | | | | |
|---|---|---|---|---|
| 4,829,850 | A | * 5/1989 | Soloy | ............ B64D 35/08 74/606 R |
| 2015/0274290 | A1 | * 10/2015 | Fenny | ............ B64C 27/32 244/17.25 |
| 2016/0123456 | A1 | * 5/2016 | Gou | ............ F16H 57/0456 184/6.4 |
| 2016/0152329 | A1 | * 6/2016 | Tzeng | ............ B64C 11/28 29/889.1 |
| 2017/0152935 | A1 | * 6/2017 | Filter | ............ F16H 57/025 |

(Continued)

*Primary Examiner* — Michael A Riegelman
(74) *Attorney, Agent, or Firm* — Lawrence Youst PLLC (57) ABSTRACT

A drive system for a tiltrotor aircraft operable to transition between rotary and non rotary flight modes. The drive system includes an engine to provide rotational energy and a proprotor assembly to receive rotational energy from the engine when the tiltrotor aircraft is in the rotary flight mode. The proprotor assembly is disengaged from the engine in the non rotary flight mode. The drive system includes a proprotor gearbox including one or more gears mechanically interposed between the engine and the proprotor assembly. The proprotor gearbox transfers rotational energy from the engine to the proprotor assembly when the tiltrotor aircraft is in the rotary flight mode. The drive system includes a lubricant operable to reduce friction between the gears and a lubrication management system to affect a temperature of the lubricant to enhance lubrication between the gears in the proprotor gearbox in the rotary flight mode.

20 Claims, 5 Drawing Sheets

(56) References Cited

U.S. PATENT DOCUMENTS

| | | | | |
|---|---|---|---|---|
| 2017/0284535 A1* | 10/2017 | Ehinger | ................. | B64C 27/14 |
| 2018/0274563 A1* | 9/2018 | Elving | ................... | F15B 11/17 |
| 2018/0371969 A1* | 12/2018 | McCormick | ........ | F16H 57/0415 |
| 2019/0219149 A1* | 7/2019 | Olson | ................. | F16H 57/0441 |
| 2019/0276158 A1* | 9/2019 | Sinusas | ................. | F01M 5/002 |
| 2020/0003295 A1* | 1/2020 | Parsons | ............... | F16H 57/0436 |
| 2021/0116015 A1* | 4/2021 | Mueller | ............. | F16H 57/0442 |
| 2021/0116016 A1* | 4/2021 | Mueller | ............. | F16H 57/0442 |
| 2021/0254705 A1* | 8/2021 | Olson | .................... | B64C 27/12 |
| 2021/0403168 A1* | 12/2021 | Parsons | ................ | B64D 27/02 |

\* cited by examiner

LUBRICATION MANAGEMENT SYSTEMS FOR TILTROTOR AIRCRAFT

TECHNICAL FIELD OF THE DISCLOSURE

The present disclosure relates, in general, to tiltrotor aircraft having rotary and non rotary flight modes and, in particular, to lubrication management systems that manage lubrication temperature and viscosity to ensure adequate lubrication between aircraft components in various flight modes.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of conventional tiltrotor aircraft in forward flight. As tiltrotor aircraft adapt to address forward airspeed induced proprotor aeroelastic instability and other challenges, the temperature and viscosity of the internal lubricant that reduces friction between various components, such as the gears of the proprotor gearboxes, should be effectively managed to ensure operational efficiency and minimal malfunctions in the various flight modes of the tiltrotor aircraft.

SUMMARY

In a first aspect, the present disclosure is directed to a drive system for a tiltrotor aircraft operable to transition between rotary and non rotary flight modes. The drive system includes an engine to provide rotational energy and a proprotor assembly to receive rotational energy from the engine when the tiltrotor aircraft is in the rotary flight mode. The proprotor assembly is disengaged from the engine in the non rotary flight mode. The drive system includes a proprotor gearbox including one or more gears mechanically interposed between the engine and the proprotor assembly. The proprotor gearbox transfers rotational energy from the engine to the proprotor assembly when the tiltrotor aircraft is in the rotary flight mode. The drive system includes a lubricant operable to reduce friction between the gears in the proprotor gearbox and a lubrication management system to affect a temperature of the lubricant while the tiltrotor aircraft is in the non rotary flight mode to enhance lubrication between the gears in the proprotor gearbox in the rotary flight mode.

In some embodiments, the gears in the proprotor gearbox may rotate in the rotary flight mode and may be substantially nonrotating in the non rotary flight mode. In certain embodiments, the lubricant may be a shared lubricant to lubricate the engine and the gears in the proprotor gearbox and the lubrication management system may include a shared lubricant reservoir to contain the shared lubricant. In some embodiments, the lubrication management system may include a lubricant circulation subsystem including lubrication conduits to circulate the shared lubricant between the engine and the proprotor gearbox. In certain embodiments, the lubricant circulation subsystem may include a lubrication pump to pump the shared lubricant to the proprotor gearbox. In some embodiments, the lubrication pump may pump the shared lubricant to the proprotor gearbox while the tiltrotor aircraft is in the rotary flight mode. In certain embodiments, the lubrication pump may pump the shared lubricant to the proprotor gearbox prior to a transition from the non rotary flight mode to the rotary flight mode. In some embodiments, the drive system may include a mid-wing gearbox including one or more gears mechanically interposed between the engine and the proprotor gearbox. In such embodiments, the shared lubricant may lubricate the gears in the mid-wing gearbox.

In certain embodiments, the drive system may include an engine lubricant to lubricate the engine and the lubrication management system may include an engine lubricant reservoir to contain the engine lubricant and an engine lubricant circulation subsystem including an engine lubricant pump to circulate the engine lubricant toward the proprotor gearbox, proximate to the proprotor gearbox and back toward the engine, thereby cooling the engine lubricant and heating the proprotor gearbox. In some embodiments, the engine lubricant pump may circulate the engine lubricant when the tiltrotor aircraft is in the non rotary flight mode. In certain embodiments, the lubrication management system may include a proprotor gearbox lubricant reservoir proximate to the proprotor gearbox to contain the lubricant. In such embodiments, the engine lubricant circulation subsystem may further circulate the engine lubricant proximate to the proprotor gearbox lubricant reservoir to heat the lubricant therein. In some embodiments, the lubrication management system may include an electrothermal heater proximate to the proprotor gearbox, the electrothermal heater operable to heat the proprotor gearbox. In certain embodiments, the electrothermal heater may include electrically heated resistive elements. In some embodiments, the proprotor gearbox has an outer surface and the electrothermal heater may partially or fully cover the outer surface of the proprotor gearbox. In certain embodiments, the proprotor gearbox forms an inner chamber containing the gears and all or a portion of the electrothermal heater may be disposed in the inner chamber of the proprotor gearbox. In some embodiments, the lubrication management system may include a proprotor gearbox lubricant reservoir proximate to the proprotor gearbox to contain the lubricant and the electrothermal heater may be proximate to the proprotor gearbox lubricant reservoir to heat the lubricant therein. In certain embodiments, the proprotor gearbox lubricant reservoir has an outer surface and the electrothermal heater may fully or partially cover the outer surface of the proprotor gearbox lubricant reservoir. In some embodiments, the proprotor gearbox lubricant reservoir forms an inner chamber containing the lubricant and all or a portion of the electrothermal heater may be disposed in the inner chamber of the proprotor gearbox lubricant reservoir.

In certain embodiments, the engine may output heated air and the lubrication management system may include an air distribution subsystem to transport the heated air from the engine to the proprotor gearbox to heat the gears therein. In some embodiments, the heated air from the engine may be compressed air and the engine may include a compressor to output the compressed air. In certain embodiments, the lubrication management system may include a proprotor gearbox lubricant reservoir proximate to the proprotor gearbox to contain the lubricant and the air distribution subsystem may transport the heated air to the proprotor gearbox lubricant reservoir to heat the lubricant therein. In some embodiments, the lubrication management system may include a portion of an environmental control system outputting heated air and an air distribution subsystem to transport the heated air from the environment control system to the proprotor gearbox to heat the gears therein. In certain embodiments, the lubrication management system may include a proprotor gearbox lubricant reservoir proximate to the proprotor gearbox to contain the lubricant and the air distribution subsystem may transport the heated air from the environmental control system to the proprotor gearbox lubricant reservoir to heat the lubricant therein.

In a second aspect, the present disclosure is directed to a tiltrotor aircraft operable to transition between rotary and non rotary flight modes. The tiltrotor aircraft includes a fuselage, a wing coupled to the fuselage, an engine disposed in the fuselage, a pylon assembly rotatably coupled to the wing and a proprotor assembly rotatably coupled to the pylon assembly. The proprotor assembly receives rotational energy from the engine when the tiltrotor aircraft is in the rotary flight mode. The proprotor assembly is disengaged from the engine in the non rotary flight mode. The tiltrotor aircraft includes a proprotor gearbox disposed in the pylon assembly. The proprotor gearbox includes one or more gears mechanically interposed between the engine and the proprotor assembly. The proprotor gearbox transfers rotational energy from the engine to the proprotor assembly when the tiltrotor aircraft is in the rotary flight mode. The tiltrotor aircraft includes a lubricant operable to reduce friction between the gears in the proprotor gearbox and a lubrication management system to affect a temperature of the lubricant while the tiltrotor aircraft is in the non rotary flight mode to enhance lubrication between the gears in the proprotor gearbox in the rotary flight mode.

In some embodiments, the lubricant may be oil. In certain embodiments, the lubrication management system may selectively heat the lubricant. In some embodiments, the tiltrotor aircraft may include a mid-wing gearbox including one or more gears mechanically interposed between the engine and the proprotor gearbox and a lubricant operable to reduce friction between the gears in the mid-wing gearbox. In such embodiments, the lubrication management system may selectively heat the lubricant of the mid-wing gearbox.

In certain embodiments, the lubrication management system may heat the lubricant prior to a transition from the non rotary flight mode to the rotary flight mode. In some embodiments, the lubrication management system may heat the lubricant a predetermined time prior to the transition from the non rotary flight mode to the rotary flight mode.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
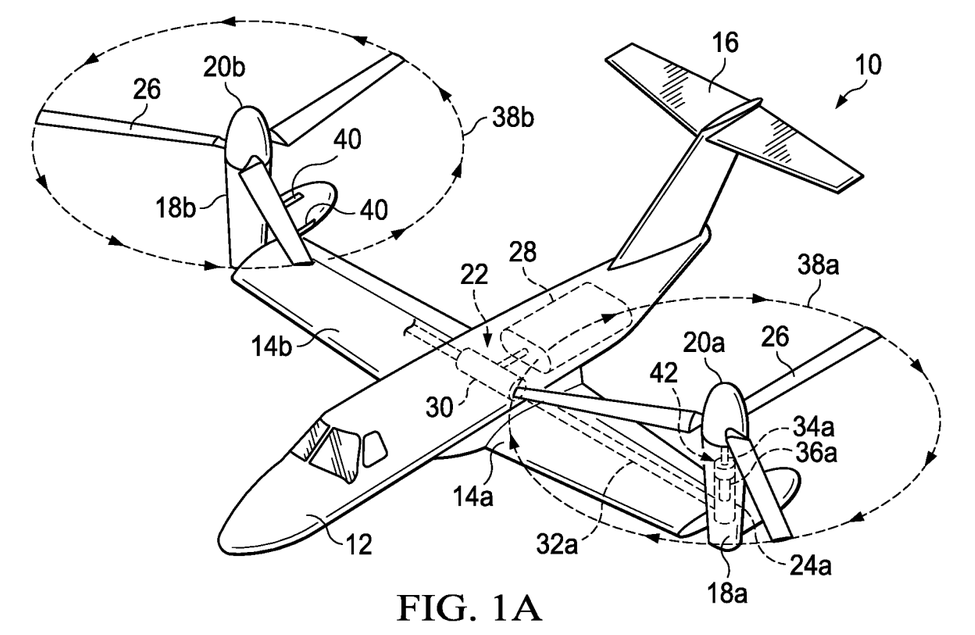
FIGS. 1A-1D are schematic illustrations of a tiltrotor aircraft in various flight modes in accordance with embodiments of the present disclosure.
Figure 1B:
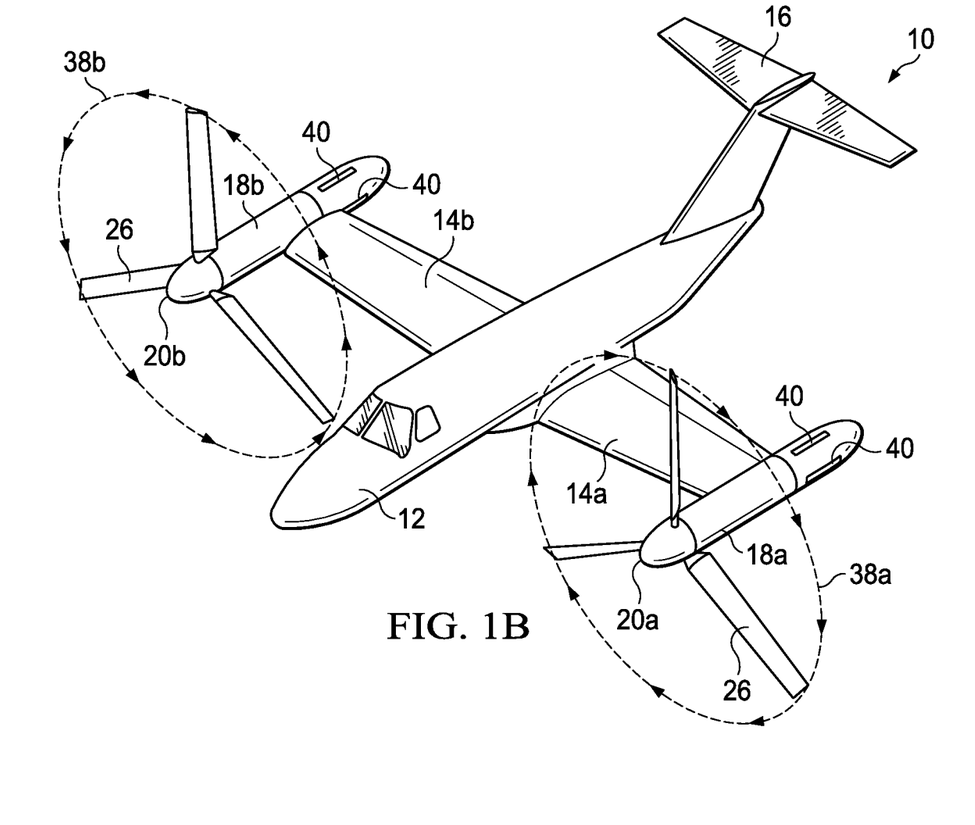
Figure 1C:
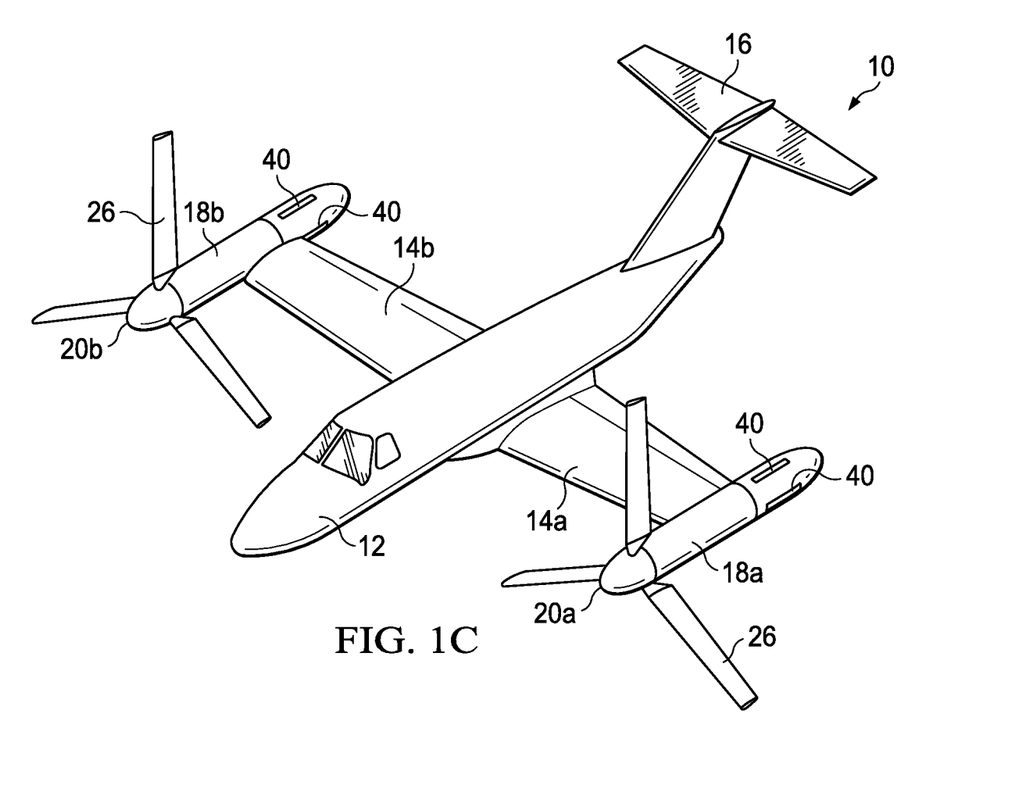
Figure 1D:
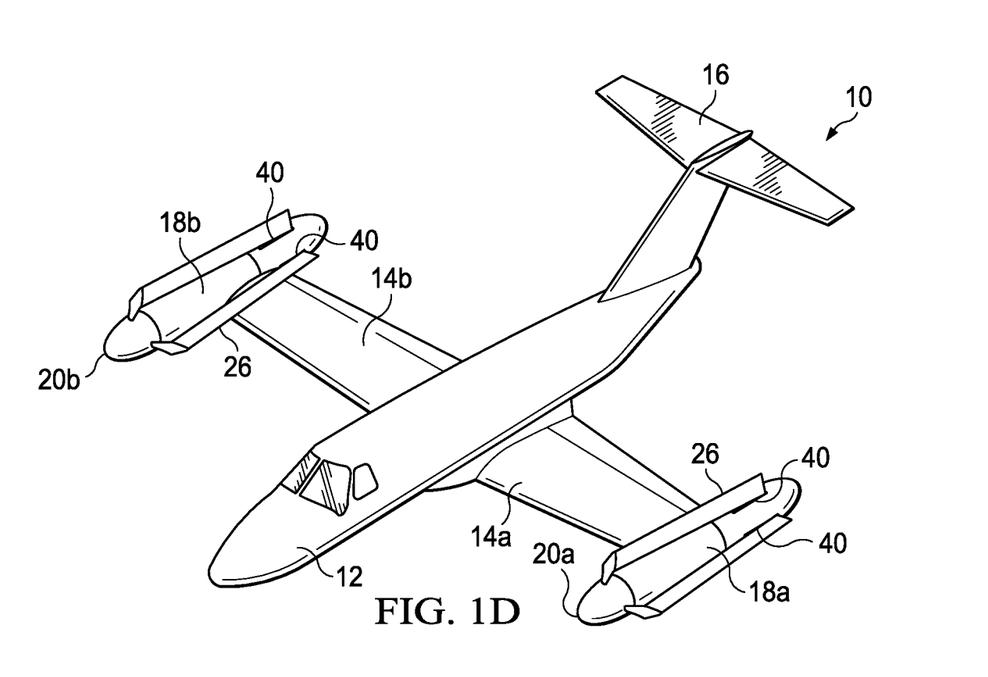

Referring to FIGS. 1A-1D in the drawings, a tiltrotor aircraft is schematically illustrated and generally designated 10. Tiltrotor aircraft 10 includes a fuselage 12, wings 14a, 14b coupled to fuselage 12 and a tail assembly 16 including control surfaces operable for horizontal and/or vertical stabilization during forward flight. Rotatably coupled to the outboard ends of wings 14a, 14b are pylon assemblies 18a, 18b that are rotatable relative to wings 14a, 14b between a generally vertical orientation, as best seen in FIG. 1A, and a generally horizontal orientation, as best seen in FIGS. 1B-1D. Proprotor assemblies 20a, 20b are rotatably coupled to pylon assemblies 18a, 18b, respectively. Pylon assemblies 18a, 18b each house a portion of a drive system 22 that is used to rotate proprotor assemblies 20a, 20b, respectively. For example, a proprotor gearbox 24a is housed within pylon assembly 18a.

Each proprotor assembly 20a, 20b includes a plurality of proprotor blades 26 that are operable to be rotated, as best seen in FIGS. 1A-1B, operable to be feathered, stopped, clocked and locked, as best seen in FIG. 1C and operable to be folded, as best seen in FIG. 1D. In the illustrated embodiment, proprotor assembly 20a is rotated responsive to torque and rotational energy provided by an engine 28 via mid-wing gearbox 30, output shaft 32a, proprotor gearbox 24a and a mast 34a. Similarly, proprotor assembly 20b is rotated responsive to torque and rotational energy provided by engine 28 via mid-wing gearbox 30, an output shaft (not pictured), a proprotor gearbox (not pictured) and a mast (not pictured). Each proprotor gearbox includes a proprotor gearbox housing and one or more gears 36a, such as planetary gears, mechanically interposed between engine 28 and a respective one of proprotor assemblies 20a, 20b. Each proprotor gearbox is used to adjust the output of engine 28 to a suitable rotational speed so that engine 28 and proprotor assemblies 20a, 20b may rotate at optimum speeds in rotary flight modes of tiltrotor aircraft 10. Mid-wing gearbox 30 may include one or more gears mechanically interposed between engine 28 and the proprotor gearboxes. Engine 28 is located in the aft portion of fuselage 12. In some embodiments, engine 28 may include two or more engines, such as a dual engine configuration in which each engine provides rotational energy to a respective one of proprotor assemblies 20a, 20b. Engine 28 may be operated in either a turboshaft mode, as best seen in FIGS. 1A-1B or a turbofan mode, as best seen in FIGS. 1C-1D.

FIG. 1A illustrates tiltrotor aircraft 10 in VTOL or helicopter flight mode, in which proprotor assemblies 20a, 20b are rotating in a substantially horizontal plane to provide vertical lift, such that tiltrotor aircraft 10 flies much like a conventional helicopter. In this configuration, engine 28 is operating in turboshaft mode wherein hot combustion gases in engine 28 cause rotation of a power turbine that is mechanically coupled to proprotor assemblies 20a, 20b. Thus, in this configuration, tiltrotor aircraft 10 is considered to be in a rotary flight mode, wherein the rotary propulsion system of tiltrotor aircraft 10, including engine 28, mid-wing gearbox 30, the proprotor gearboxes and proprotor assemblies 20a, 20b as well as the shafts and/or other elements coupled therebetween, provides thrust in the form of vertical lift for tiltrotor aircraft 10. In the rotary flight mode of tiltrotor aircraft 10, the gears inside the proprotor gearboxes transfer rotational energy from engine 28 to proprotor assemblies 20a, 20b such that proprotor assemblies 20a, 20b receive rotational energy from engine 28. The gears inside the proprotor gearboxes, such as gears 36a, rotate in the rotary flight mode. FIG. 1B illustrates tiltrotor aircraft 10 in proprotor forward flight mode, in which proprotor assemblies 20a, 20b are rotating in a substantially vertical plane to provide forward thrust enabling wings 14a, 14b to provide a lifting force responsive to forward airspeed, such that tiltrotor aircraft 10 flies much like a conventional propeller driven aircraft. In this configuration, engine 28 is operating in the turboshaft mode and tiltrotor aircraft 10 is considered to be in the rotary flight mode.

In the rotary flight mode of tiltrotor aircraft 10, proprotor assemblies 20a, 20b rotate in opposite directions to provide torque balancing to tiltrotor aircraft 10. For example, when viewed from the front of tiltrotor aircraft 10 in proprotor forward flight mode (FIG. 1B) or from the top in helicopter mode (FIG. 1A), proprotor assembly 20a rotates clockwise, as indicated by motion arrows 38a, and proprotor assembly 20b rotates counterclockwise, as indicated by motion arrows 38b. In the illustrated embodiment, proprotor assemblies 20a, 20b each include three proprotor blades 26 that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having two, four, five or more proprotor blades. In addition, it should be appreciated that tiltrotor aircraft 10 can be operated such that proprotor assemblies 20a, 20b are selectively positioned between proprotor forward flight mode and helicopter mode, which can be referred to as a conversion flight mode.

FIG. 1C illustrates tiltrotor aircraft 10 in transition from proprotor forward flight mode to airplane forward flight mode, in which the torque path between engine 28 and proprotor assemblies 20a, 20b has been interrupted and proprotor blades 26 have been feathered, or oriented to be streamlined in the direction of flight, such that proprotor blades 26 act as brakes to aerodynamically slow the rotation of proprotor assemblies 20a, 20b. In the illustrated embodiment, the rotation of proprotor assemblies 20a, 20b is stopped using, for example, brake systems. The brake systems may include position sensors such that the output shafts can be stopped at predetermined rotational positions. By stopping the output shafts in known rotational positions, the rotational positions of proprotor assemblies 20a, 20b is also known. This rotational clocking of proprotor blades 26 is important to align each proprotor blade 26 with a respective slot 40 in pylon assemblies 18a, 18b for folding and to prevent contact with wings 14a, 14b. In the illustrated configuration of tiltrotor aircraft 10, engine 28 is operating in turbofan mode wherein hot combustion gases in engine 28 cause rotation of a power turbine coupled to an output shaft that is used to power a turbofan that forces bypass air through a fan duct to create forward thrust enabling wings 14a, 14b to provide a lifting force responsive to forward airspeed, such that tiltrotor aircraft 10 flies much like a conventional jet aircraft. In this configuration, tiltrotor aircraft 10 is considered to be in a non rotary flight mode as proprotor assemblies 20a, 20b are no longer providing thrust for tiltrotor aircraft 10. Because proprotor assemblies 20a, 20b are disengaged from engine 28 in non rotary flight mode, the gears inside the proprotor gearboxes, such as gears 36a, do not rotate.

FIG. 1D illustrates tiltrotor aircraft 10 in high speed, airplane forward flight mode, in which proprotor blades 26 have been folded to be oriented substantially parallel to respective pylon assemblies 18a, 18b to minimize the drag force generated by proprotor blades 26. To prevent chatter or other movement of proprotor blades 26 when folded, proprotor blades 26 are preferably received within slots 40 of pylon assemblies 18a, 18b. In this configuration, engine 28 is operating in the turbofan mode and tiltrotor aircraft 10 is considered to be in the non rotary flight mode. The forward cruising speed of tiltrotor aircraft 10 can be significantly higher in airplane forward flight mode versus proprotor forward flight mode as the forward airspeed induced proprotor aeroelastic instability is overcome.

Traditional tiltrotor aircraft typically fly in rotary flight mode at all times, causing the gears in their drive system gearboxes to be in constant motion at all altitudes. Tiltrotor aircraft 10 typically flies at lower altitudes in rotary flight mode, such as during vertical takeoff and landing, and at higher altitudes in non rotary flight mode. Thus, the gears of the proprotor gearboxes are more likely to rotate at low altitudes and remain stationary at high altitudes. The disengagement of the gears in the proprotor gearboxes from engine 28 in non rotary flight mode at high altitudes can adversely affect the lubricant that reduces friction between these gears. In particular, without the constant motion of the gears in the proprotor gearboxes imparting friction-induced heat to the surrounding lubricant, the lubricant is allowed to cool to ambient temperatures. In non rotary flight mode, the temperature of the proprotor gearbox lubricant may be inversely proportional to the altitude of tiltrotor aircraft 10. The extremely cold temperatures that may be encountered by tiltrotor aircraft 10 at high altitudes, which may be −80 degrees Fahrenheit or below in some circumstances, may cause a proportionate increase in the viscosity of the proprotor gearbox lubricant. As tiltrotor aircraft 10 descends and transitions from non rotary flight mode to rotary flight mode, the gears in the proprotor gearboxes reengage with engine 28 and are thus put into motion. Because the proprotor gearbox lubricant may still be cold from high altitude flight in non rotary flight mode, the lubricant may be too viscous for proper operation of the proprotor gearboxes and may require significant starting torque, render the lubrication pump unable to apply lubricant onto the gears and possibly result in damage to the proprotor gearboxes. The lubricant that reduces friction for the swashplates, swashplate actuators, swashplate controls and other components of tiltrotor aircraft 10 may also be subject to these problems.

Tiltrotor aircraft 10 includes a lubrication management system 42 to manage and affect the temperature of the lubricant while tiltrotor aircraft 10 is in non rotary flight mode so that lubrication between the gears in the proprotor gearboxes may be enhanced in rotary flight mode, including the transition from non rotary flight mode to rotary flight mode. Thus, when tiltrotor aircraft 10 is in non rotary flight mode at a high altitude, lubrication management system 42 may be activated at any time to ensure that the lubricant in the proprotor gearboxes is sufficiently heated when tiltrotor aircraft 10 transitions to rotary flight mode. Lubrication management system 42 may manage the temperature of the lubricant in one of several different ways, as shown by the illustrative embodiments. In some embodiments of lubrication management system 42, the lubricant is shared by engine 28 and the proprotor gearboxes so that even when the proprotor gearboxes are disengaged in non rotary flight mode, heat from engine 28 continues to warm the lubricant for eventual use when tiltrotor aircraft 10 transitions to rotary flight mode. In other embodiments, lubrication management system 42 may selectively heat the lubricant at any time prior to the reengagement of the gears in the proprotor gearboxes for rotary flight mode. For example, lubrication management system 42 may heat the proprotor gearbox lubricant while tiltrotor aircraft 10 descends from a high altitude, thereby preparing the lubricant for use and protecting the integrity of the components in the proprotor gearboxes.

While the gears of the proprotor gearboxes remain substantially stationary in non rotary flight mode, some gears of mid-wing gearbox 30 may continue being utilized in non rotary flight mode for generators, control surfaces and other accessories used in airplane mode. In other embodiments, the gears of mid-wing gearbox 30 may remain substantially stationary in non rotary flight mode. In either case, lubrication management system 42 may be used to selectively heat the lubricant that reduces friction in mid-wing gearbox 30, as in cases where the lubricant has become overly viscous at high altitudes. In yet other embodiments, tiltrotor aircraft 10 may exclude mid-wing gearbox 30. The lubricant managed by lubrication management system 42 may include oil. In other embodiments, lubrication management system 42 may also be used to regulate the temperature and viscosity of other fluids in tiltrotor aircraft 10, such as coolant. Lubrication management system 42 may also include a thermostat that monitors the temperature of the lubricant and determines whether the lubricant is sufficiently hot for efficient operation in rotary flight mode. A determination by the thermostat that the lubricant is too cold or viscous may trigger lubrication management system 42 to heat the lubricant. The thermostat may also notify the pilot, flight control computer or other operator that the lubricant needs to be heated if the lubricant drops below a threshold temperature.

It should be appreciated that tiltrotor rotorcraft 10 is merely illustrative of a variety of aircraft that can implement the embodiments disclosed herein. Indeed, lubrication management system 42 may be utilized on any aircraft that uses fluid, such as lubrication. Other aircraft implementations can include hybrid aircraft, compound aircraft, tiltwing aircraft, quad tiltrotor aircraft, helicopters, jets, propeller airplanes, unmanned aerial systems and the like. As such, those skilled in the art will recognize that lubrication management system 42 disclosed herein can be integrated into a variety of aircraft configurations. It should be appreciated that even though aircraft are particularly well-suited to implement the embodiments of the present disclosure, non-aircraft vehicles and devices can also implement the embodiments.

Figure 2:
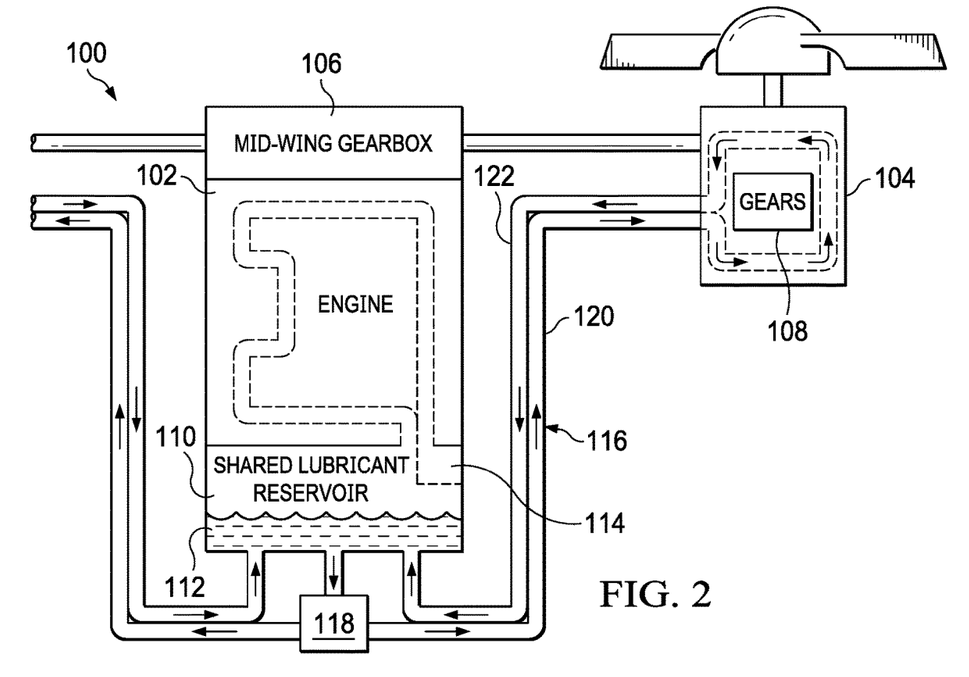
FIGS. 2-6 are block diagrams of different lubrication management systems for use in tiltrotor aircraft in accordance with embodiments of the present disclosure.

Referring to FIG. 2 in the drawings, a lubrication management system for tiltrotor aircraft is schematically illustrated and generally designated 100. The tiltrotor aircraft includes engine 102 and proprotor gearbox 104, with mid-wing gearbox 106 mechanically interposed therebetween. Proprotor gearbox 104 includes gears 108. Lubrication management system 100 includes a shared lubricant reservoir 110 that contains shared lubricant 112. Shared lubricant 112 lubricates both engine 102 and gears 108. Lubrication pump 114 pumps shared lubricant 112 into engine 102 to lubricate the components therein. Lubrication management system 100 also includes a lubricant circulation subsystem 116, including one or more conduits, to circulate shared lubricant 112 between engine 102, shared lubricant reservoir 110 and proprotor gearbox 104. In particular, lubrication pump 118 pumps shared lubricant 112 outboard to proprotor gearbox 104 via conduit 120. Upon reaching proprotor gearbox 104, shared lubricant 112 is applied onto gears 108 to reduce the friction therebetween. Shared lubricant 112 is then pumped inboard back to shared lubricant reservoir 110 via conduit 122 using lubrication pump 118 or a different pump.

By utilizing shared lubricant 112 for both engine 102 and proprotor gearbox 104, engine 102 can heat shared lubricant 112 in all flight modes of the tiltrotor aircraft so that the shared lubricant heated by engine 102 may be utilized by proprotor gearbox 104 at any time. In this manner, lubrication management system 100 affects the temperature of shared lubricant 112 to enhance the lubrication between gears 108. Lubrication pump 118 pumps shared lubricant 112 to proprotor gearbox 104 while the tiltrotor aircraft is in rotary flight mode. In some embodiments, lubrication pump 118 may also pump shared lubricant 112 to proprotor gearbox 104 prior to a transition from non rotary flight mode to rotary flight mode so that proprotor gearbox 104 receives shared lubricant 112 before being engaged with engine 102. For example, lubrication pump 118 may pump shared lubricant 112 to proprotor gearbox 104 while the tiltrotor aircraft descends from a high altitude. Lubrication pump 118 may also pump shared lubricant 112 to proprotor gearbox 104 at a predetermined or manually-determined time prior to transitioning from non rotary flight mode to rotary flight mode. In some embodiments, shared lubricant 112 may also be used to lubricate the gears in mid-wing gearbox 106.

Figure 3:
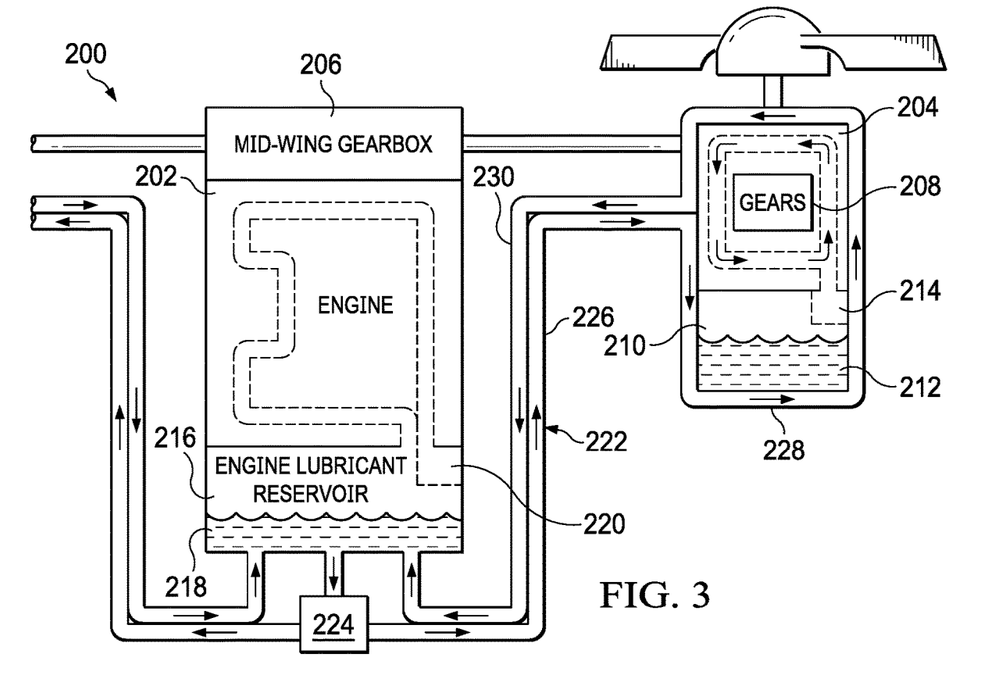

Referring to FIG. 3 in the drawings, a lubrication management system for a tiltrotor aircraft is schematically illustrated and generally designated 200. The tiltrotor aircraft includes engine 202 and proprotor gearbox 204, with mid-wing gearbox 206 mechanically interposed therebetween. Proprotor gearbox 204 includes gears 208. Lubrication management system 200 includes proprotor gearbox lubricant reservoir 210 containing lubricant 212, which lubrication pump 214 pumps into proprotor gearbox 204 to lubricate gears 208. In the illustrated embodiment, lubricant 212 is not shared with engine 202. Lubrication management system 200 includes engine lubricant reservoir 216 containing engine lubricant 218, which is pumped by lubrication pump 220 into engine 202 to lubricate the components therein. Lubrication management system 200 also includes engine lubricant circulation subsystem 222, which includes engine lubricant pump 224 to circulate engine lubricant 218 outboard toward proprotor gearbox 204 via conduit 226, proximate to proprotor gearbox 204 and proprotor gearbox lubricant reservoir 210 via conduit 228 and inboard back toward engine 202 via conduit 230. Engine lubricant 218 is not sprayed onto gears 208 but is instead used to warm gears 208 and lubricant 212 by its proximity to these elements. In some embodiments, conduit 228 may circulate engine lubricant 218 proximate to only one of proprotor gearbox 204 or proprotor gearbox lubricant reservoir 210. Because proprotor gearbox 204, proprotor gearbox lubricant reservoir 210 and lubricant 212 have a reduced temperature in non rotary flight mode at high altitudes, the circulation of engine lubricant 218 proximate to proprotor gearbox 204 and proprotor gearbox lubricant reservoir 210 cools engine lubricant 218 and heats proprotor gearbox 204 and proprotor gearbox lubricant reservoir 210, including gears 208 and lubricant 212 therein. Heating lubricant 212 lowers its viscosity so that it may more effectively lubricate gears 208. Engine lubricant circulation subsystem 222 thus acts as a heat exchanger for engine lubricant 218 to reduce the temperature of engine lubricant 218 to a suitable level while preparing gears 208 and/or lubricant 212 for an eventual transition to rotary flight mode.

Conduit 228 may wrap around the outer surfaces of proprotor gearbox 204 and/or proprotor gearbox lubricant reservoir 210, as illustrated. In other embodiments, conduit 228 may penetrate the inner structures of proprotor gearbox 204 and/or proprotor gearbox lubricant reservoir 210. Engine lubricant pump 224 may circulate engine lubricant 218 at any time, such as when the tiltrotor aircraft is in non rotary flight mode or during a transition from non rotary flight mode to rotary flight mode. Engine lubricant pump 224 may also pump engine lubricant 218 during a descent of the tiltrotor aircraft, or any predetermined or manually-determined time prior to transitioning from non rotary flight mode to rotary flight mode, so that gears 208 and/or lubricant 212 are warmed before use in rotary flight mode.

Figure 4:
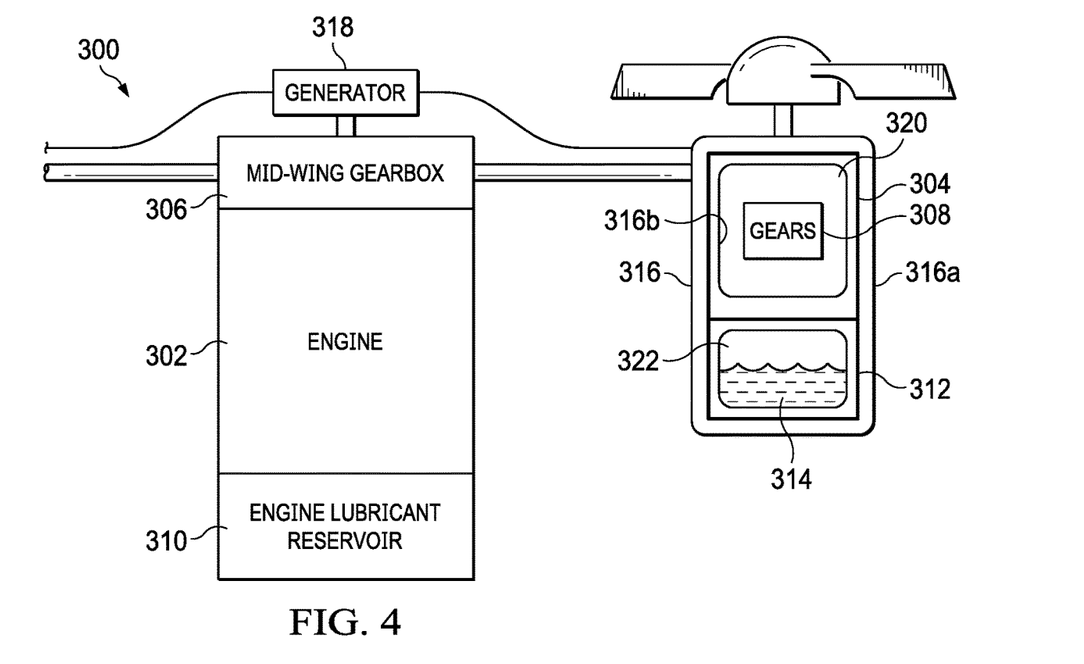

Referring to FIG. 4 in the drawings, a lubrication management system for tiltrotor aircraft is schematically illustrated and generally designated 300. The tiltrotor aircraft includes engine 302 and proprotor gearbox 304, with mid-wing gearbox 306 mechanically interposed therebetween. Proprotor gearbox 304 includes gears 308. Lubrication management system 300 includes engine lubricant reservoir 310 containing engine lubricant to lubricate engine 302 and proprotor gearbox lubricant reservoir 312 containing lubricant 314 to lubricate gears 308. Lubrication management system 300 includes an electrothermal heater 316 located proximate to proprotor gearbox 304 and proprotor gearbox lubricant reservoir 312. Electrothermal heater 316 selectively heats proprotor gearbox 304 and/or proprotor gearbox lubricant reservoir 312, including gears 308 and/or lubricant 314 therein. Heating lubricant 314 lowers its viscosity so that it may effectively lubricate gears 308.

Electrothermal heater 316 may include electrically heated resistive elements powered by electricity received from a generator 318 on board the tiltrotor aircraft. Generator 318 may be powered by engine 302 or by another power source. Electrothermal heater 316 may also be an electrothermal blanket or a de-icing grid embedded in or on proprotor gearbox 304 and/or proprotor gearbox lubricant reservoir 312. An outer portion 316a of electrothermal heater 316 may fully or partially cover the outer surfaces of proprotor gearbox 304 and/or proprotor gearbox lubricant reservoir 312. An inner portion 316b of electrothermal heater 316 may be disposed in either or both of inner chambers 320 or 322 of proprotor gearbox 304 and/or proprotor gearbox lubricant reservoir 312. In other embodiments, electrothermal heater 316 may include only outer portion 316a or only inner portion 316b.

Electrothermal heater 316 may heat gears 308 and/or lubricant 314 at any time during flight of the tiltrotor aircraft, such as when the tiltrotor aircraft is in non rotary flight mode or during a transition from non rotary flight mode to rotary flight mode. Electrothermal heater 316 may also heat gears 308 and/or lubricant 314 during a descent of the tiltrotor aircraft, or any predetermined or manually-determined time prior to transitioning from non rotary flight mode to rotary flight mode, so that gears 308 and/or lubricant 314 are warmed before use in rotary flight mode. It will be appreciated by one of ordinary skill in the art that electrothermal heater 316 may be powered by a power source other than generator 318, including non-electrical power sources.

Figure 5:
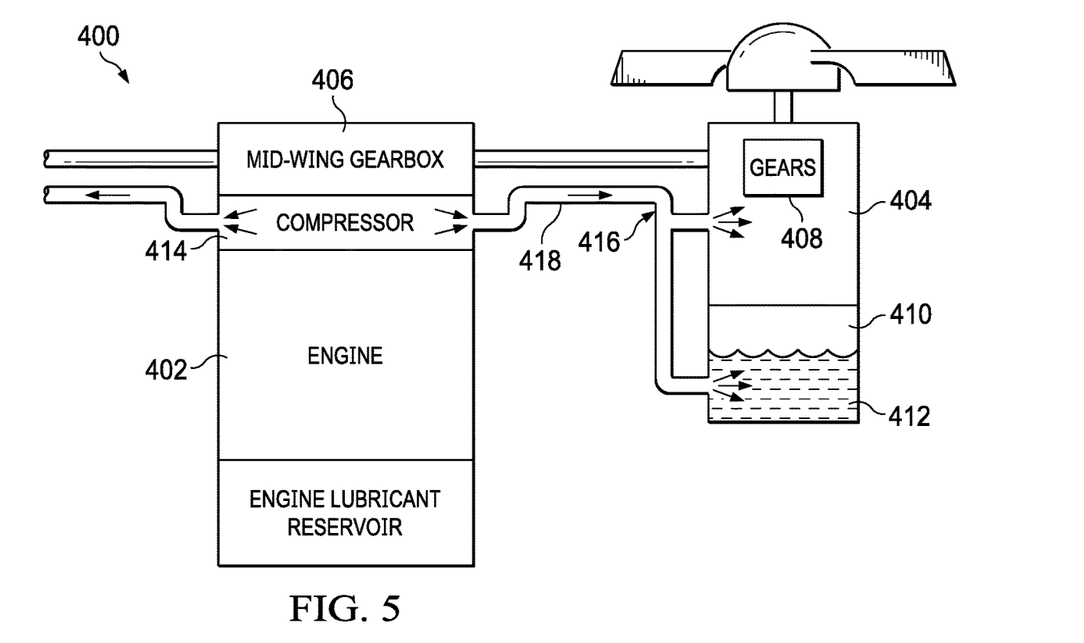

Referring to FIG. 5 in the drawings, a lubrication management system for tiltrotor aircraft is schematically illustrated and generally designated 400. The tiltrotor aircraft includes engine 402 and proprotor gearbox 404, with mid-wing gearbox 406 mechanically interposed therebetween. Proprotor gearbox 404 includes gears 408. Lubrication management system 400 includes proprotor gearbox lubricant reservoir 410 containing lubricant 412 used to lubricate gears 408. Engine 402 includes a compressor 414 that compresses and heats air. The air may be heated and compressed in a compression chamber prior to being emitted into a combustion chamber. Lubrication management system 400 includes an air distribution subsystem 416 to transport the compressed and heated air from compressor 414 to proprotor gearbox 404 and/or proprotor gearbox lubricant reservoir 410, including gears 408 and/or lubricant 412 therein. Air distribution subsystem 416 may include one or more conduits 418 to deliver high pressure and high temperature air from compressor 414. The temperature of the air emitted from compressor 414 may be any suitable temperature to heat gears 408 and/or lubricant 412, such as air having a temperature in a range between about 100 degrees and about 300 degrees Celsius, such as approximately 200 degrees Celsius. In the illustrated embodiment, engine 402 bleeds heated air, acting as an air-to-oil heat exchanger. Heated and compressed air may be delivered to proprotor gearbox 404 and/or proprotor gearbox lubricant reservoir 410 at any time during flight of the tiltrotor aircraft, such as when the tiltrotor aircraft is in non rotary flight mode or during a transition from non rotary flight mode to rotary flight mode. Heated and compressed air may also be delivered to proprotor gearbox 404 and/or proprotor gearbox lubricant reservoir 410 during a descent of the tiltrotor aircraft, or any predetermined or manually-determined time prior to transitioning from non rotary flight mode to rotary flight mode, so that gears 408 and/or lubricant 412 are warmed before use in rotary flight mode.

Figure 6:
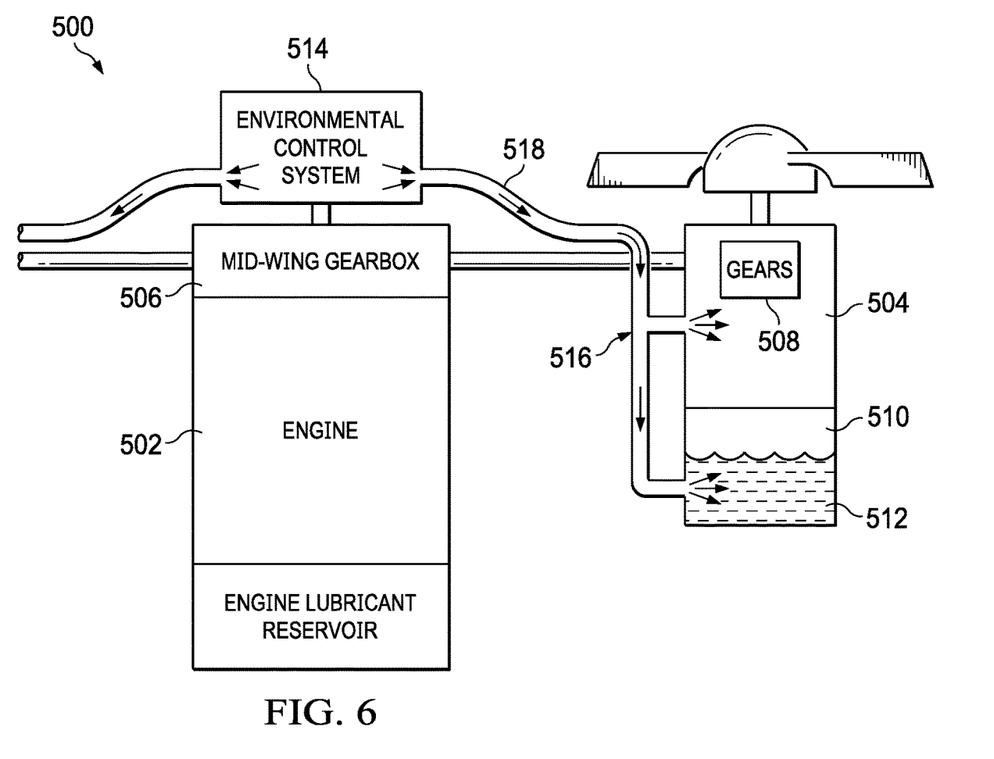

Referring to FIG. 6 in the drawings, a lubrication management system for tiltrotor aircraft is schematically illustrated and generally designated 500. The tiltrotor aircraft includes engine 502 and proprotor gearbox 504, with mid-wing gearbox 506 mechanically interposed therebetween. Proprotor gearbox 504 includes gears 508. The tiltrotor aircraft includes an environmental control system 514, which may compress and/or condition air for use throughout the tiltrotor aircraft, including the cabin, cockpit and other areas. Environmental control system 514 may be electrically driven, engine driven or powered by another power source. Lubrication management system 500 includes air distribution subsystem 516 that includes one or more conduits 518 to transport heated and/or compressed air from environmental control system 514 to proprotor gearbox 504 and/or proprotor gearbox lubricant reservoir 510 to heat gears 508 and/or lubricant 512 therein. Heated and/or compressed air may be delivered to proprotor gearbox 504 and/or proprotor gearbox lubricant reservoir 510 at any time during flight of the tiltrotor aircraft, such as when the tiltrotor aircraft is in non rotary flight mode or during a transition from non rotary flight mode to rotary flight mode. Heated and/or compressed air may also be delivered to proprotor gearbox 504 and/or proprotor gearbox lubricant reservoir 510 during a descent of the tiltrotor aircraft, or any predetermined or manually-determined time prior to transitioning from non rotary flight mode to rotary flight mode, so that gears 508 and/or lubricant 512 are warmed before use in rotary flight mode. In other embodiments, lubrication management system 500 may utilize a magnetic field generator to warm gears 508 and/or lubricant 512.

In FIGS. 2-6 above, the illustrative embodiments have been described with respect to a single propulsion assembly for sake of efficiency. One having ordinary skill in the art, however, will fully appreciate that the tiltrotor aircraft disclosed in these figures may include two or more propulsion assemblies and will fully appreciate an understanding of such additional propulsion assemblies based upon the disclosure herein of the single propulsion assembly in FIGS. 2-6. For example, proprotor gearboxes 104, 204, 304, 404 or 504 may be located on one of a port or starboard side of the tiltrotor aircraft while another substantially similar proprotor gearbox may be symmetrically located on the other of the port or starboard side of the tiltrotor aircraft such that the lubrication management systems affect the temperature of the lubricant used by both proprotor gearboxes.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A drive system for a tiltrotor aircraft operable to transition between rotary and non rotary flight modes, the drive system comprising:
    an engine to provide rotational energy;
    a proprotor assembly to receive rotational energy from the engine when the tiltrotor aircraft is in the rotary flight mode, the proprotor assembly disengaged from the engine in the non rotary flight mode;
    a proprotor gearbox including one or more gears mechanically interposed between the engine and the proprotor assembly, the proprotor gearbox transferring rotational energy from the engine to the proprotor assembly when the tiltrotor aircraft is in the rotary flight mode;
    a lubricant operable to reduce friction between the gears in the proprotor gearbox; and
    a lubrication management system to affect a temperature of the lubricant while the tiltrotor aircraft is in the non rotary flight mode to enhance lubrication between the gears in the proprotor gearbox in the rotary flight mode.

2. The drive system as recited in claim 1 wherein the gears in the proprotor gearbox rotate in the rotary flight mode and are substantially nonrotating in the non rotary flight mode.

3. The drive system as recited in claim 1 wherein the lubricant further comprises shared lubricant and the lubrication management system further comprises a shared lubricant reservoir to at least partially contain the shared lubricant, the shared lubricant operable to lubricate the engine and the gears in the proprotor gearbox.

4. The drive system as recited in claim 3 wherein the lubrication management system further comprises a lubricant circulation subsystem including lubrication conduits to circulate the shared lubricant between the engine and the proprotor gearbox.

5. The drive system as recited in claim 4 wherein the lubricant circulation subsystem includes a lubrication pump to pump the shared lubricant to the proprotor gearbox.

6. The drive system as recited in claim 5 wherein the lubrication pump pumps the shared lubricant to the proprotor gearbox prior to a transition from the non rotary flight mode to the rotary flight mode.

7. The drive system as recited in claim 1 further comprising an engine lubricant to lubricate the engine, the lubrication management system further comprising:
    an engine lubricant reservoir to at least partially contain the engine lubricant; and
    an engine lubricant circulation subsystem including an engine lubricant pump to circulate the engine lubricant toward the proprotor gearbox, proximate to the proprotor gearbox and back toward the engine, thereby heating the proprotor gearbox.

8. The drive system as recited in claim 7 wherein the lubrication management system further comprises a proprotor gearbox lubricant reservoir proximate to the proprotor gearbox to at least partially contain a proprotor gearbox lubricant, the engine lubricant circulation subsystem further circulating the engine lubricant proximate to the proprotor gearbox lubricant reservoir to heat the proprotor gearbox lubricant therein.

9. The drive system as recited in claim 1 wherein the lubrication management system further comprises an electrothermal heater proximate to the proprotor gearbox, the electrothermal heater operable to heat the proprotor gearbox.

10. The drive system as recited in claim 9 wherein the electrothermal heater further comprises a plurality of electrically heated resistive elements.

11. The drive system as recited in claim 9 wherein the lubrication management system further comprises a proprotor gearbox lubricant reservoir proximate to the proprotor gearbox to at least partially contain a proprotor gearbox lubricant; and
wherein the electrothermal heater is proximate to the proprotor gearbox lubricant reservoir and is operable to heat the proprotor gearbox lubricant therein.

12. The drive system as recited in claim 11 wherein the proprotor gearbox lubricant reservoir has an outer surface and the electrothermal heater at least partially covers the outer surface of the proprotor gearbox lubricant reservoir.

13. The drive system as recited in claim 1 wherein the engine outputs heated air, the lubrication management system further comprising an air distribution subsystem to transport the heated air from the engine to the proprotor gearbox to heat the gears therein.

14. The drive system as recited in claim 13 wherein the heated air further comprises compressed air and the engine further comprises a compressor to output the compressed air.

15. The drive system as recited in claim 13 wherein the lubrication management system further comprises a proprotor gearbox lubricant reservoir proximate to the proprotor gearbox to at least partially contain a proprotor gearbox lubricant, the air distribution subsystem further operable to transport the heated air to the proprotor gearbox lubricant reservoir to heat the proprotor gearbox lubricant therein.

16. The drive system as recited in claim 1 wherein the lubrication management system further comprises a portion of an environmental control system outputting heated air and an air distribution subsystem to transport the heated air from the environment control system to the proprotor gearbox to heat the gears therein.

17. The drive system as recited in claim 16 wherein the lubrication management system further comprises a proprotor gearbox lubricant reservoir proximate to the proprotor gearbox to at least partially contain a proprotor gearbox lubricant, the air distribution subsystem further operable to transport the heated air from the environmental control system to the proprotor gearbox lubricant reservoir to heat the proprotor gearbox lubricant therein.

18. A tiltrotor aircraft operable to transition between rotary and non rotary flight modes, the tiltrotor aircraft comprising:
a fuselage;
a wing coupled to the fuselage;
an engine disposed in the fuselage, the engine to provide rotational energy;
a pylon assembly rotatably coupled to the wing;
a proprotor assembly rotatably coupled to the pylon assembly, the proprotor assembly to receive rotational energy from the engine when the tiltrotor aircraft is in the rotary flight mode, the proprotor assembly disengaged from the engine in the non rotary flight mode;
a proprotor gearbox disposed in the pylon assembly, the proprotor gearbox including one or more gears mechanically interposed between the engine and the proprotor assembly, the proprotor gearbox transferring rotational energy from the engine to the proprotor assembly when the tiltrotor aircraft is in the rotary flight mode;
a lubricant operable to reduce friction between the gears in the proprotor gearbox; and
a lubrication management system to affect a temperature of the lubricant while the tiltrotor aircraft is in the non rotary flight mode to enhance lubrication between the gears in the proprotor gearbox in the rotary flight mode.

19. The tiltrotor aircraft as recited in claim 18 wherein the lubrication management system is further operable to selectively heat the lubricant.

20. The tiltrotor aircraft as recited in claim 18 wherein the lubrication management system heats the lubricant prior to a transition from the non rotary flight mode to the rotary flight mode.

* * * * *